(12) United States Patent
Rozelle

(10) Patent No.: US 7,912,664 B2
(45) Date of Patent: Mar. 22, 2011

(54) SELF CALIBRATING GYROSCOPE SYSTEM

(75) Inventor: David M. Rozelle, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 78 days.

(21) Appl. No.: 12/283,364

(22) Filed: Sep. 11, 2008

(65) Prior Publication Data

US 2010/0063763 A1   Mar. 11, 2010

(51) Int. Cl.
*G01C 19/00* (2006.01)

(52) U.S. Cl. ...................................................... 702/104

(58) Field of Classification Search .................... 702/104
See application file for complete search history.

(56) References Cited

U.S. PATENT DOCUMENTS

| | | | | |
|---|---|---|---|---|
| 4,179,818 A | * | 12/1979 | Craig | 33/321 |
| 4,321,678 A | * | 3/1982 | Krogmann | 701/220 |
| 5,562,266 A | * | 10/1996 | Achkar et al. | 244/171 |
| 7,437,230 B2 | * | 10/2008 | McClure et al. | 701/50 |
| 7,728,587 B2 | * | 6/2010 | Stewart et al. | 324/304 |
| 2008/0269988 A1 | * | 10/2008 | Feller et al. | 701/41 |

* cited by examiner

*Primary Examiner* — Cindy Hien-Dieu Khuu
(74) *Attorney, Agent, or Firm* — Carmen Patti Law Group, LLC

(57) ABSTRACT

A self-calibrating gyroscope system provides improved estimates of, and compensation or calibration for, scale factor errors and bias errors. The gyroscope system employs a plurality of gyroscope units having sense or input axes in a mutually non-parallel arrangement. A Mode Reversal technique is used to obtain an estimate of bias error for a selected gyroscope. A Random Closed-Loop Scale Factor technique is used to obtain an estimate of scale factor error for a selected gyroscope. Because the Mode Reversal technique temporarily disrupts operation of the affected gyroscope, each of the gyroscopes may be taken offline temporarily, in turn, for calibration, and thereafter returned to normal operation. Because at least one redundant gyroscope is provided, when a selected gyroscope is offline, rate information from the remaining operating gyroscopes can be used to derive a reference rate about the axis of the offline gyroscope.

24 Claims, 13 Drawing Sheets

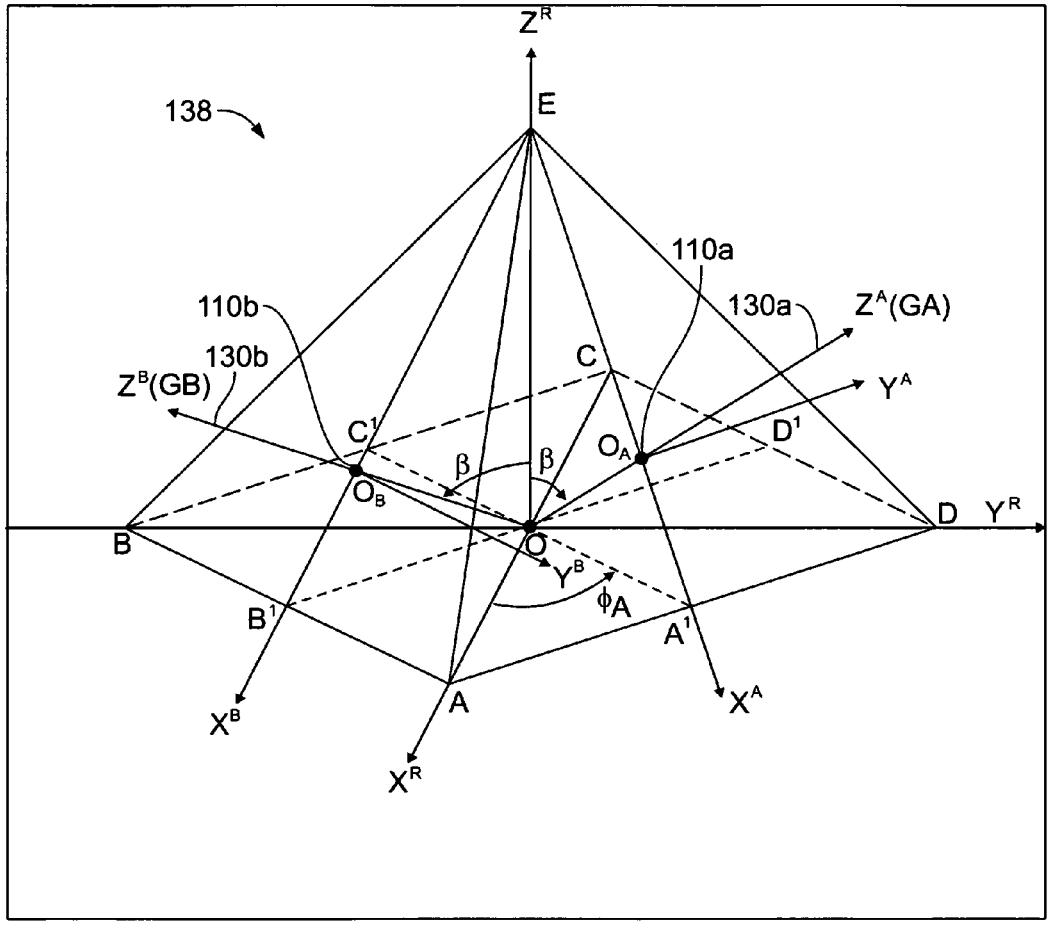

$X^R, Y^R, Z^R$: CIMU reference coordinates
$X^{GA}, Y^{GA}, Z^{GA}$: Individual gyro reference coordinates of gyro GA
$X^{GB}, Y^{GB}, Z^{GB}$: Individual gyro reference coordinates of gyro GB
O: Origin of CIMU reference coordinates
    (Center point of the regular octahedron)
$O_{GA}, O_{GB}$: Origins of GA, GB individual gyro reference coordinates
    (Center point of the equilateral triangle)
$Z^{GA}, Z^{GB}$: Sensing axis of gyro GA, GB
$\beta, \phi_i$: Angles
$\beta = 54.7356°$
$\phi_A = 45°$
$\phi_B = -45°$
$\phi_C = -135°$
$\phi_D = 135°$

FIG. 4

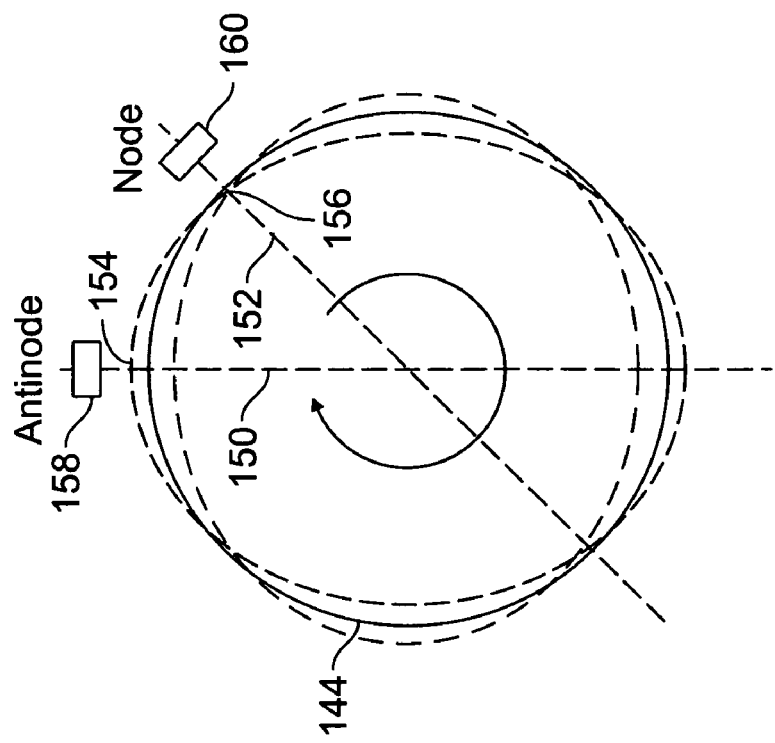
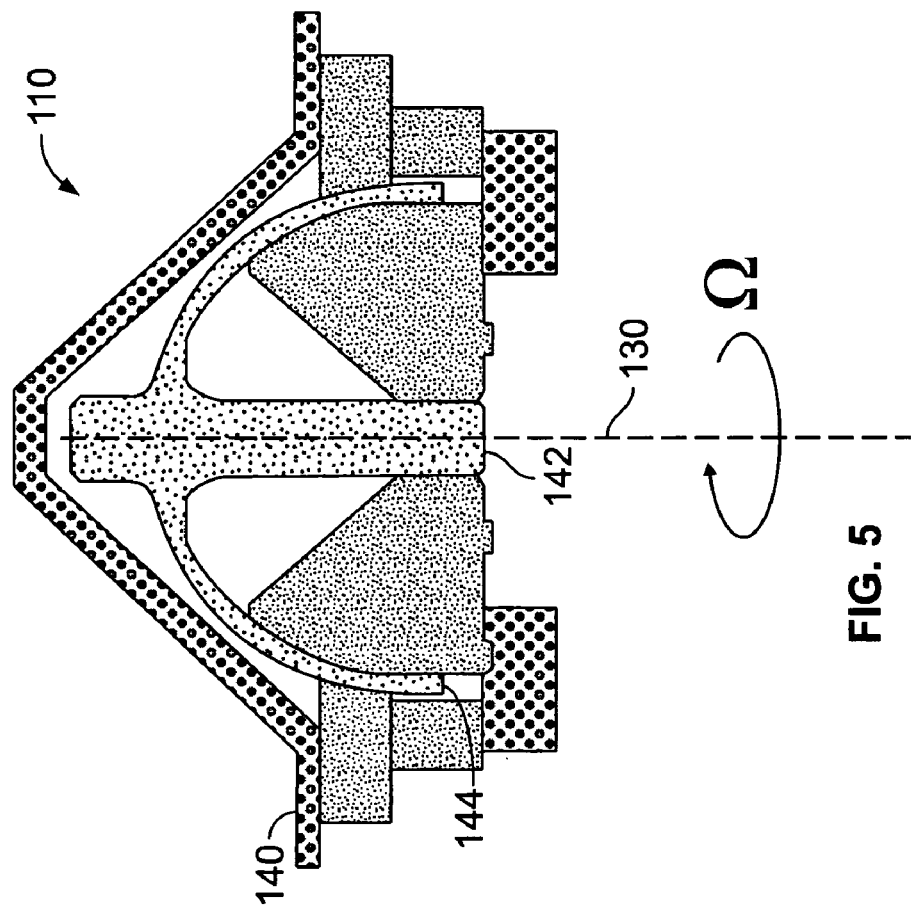
FIG. 6
FIG. 5

Gyro GA $\quad C_R^{GA} = \begin{bmatrix} \frac{1}{\sqrt{6}} & \frac{1}{\sqrt{6}} & -\sqrt{\frac{2}{3}} \\ -\frac{1}{\sqrt{2}} & \frac{1}{\sqrt{2}} & 0 \\ \frac{1}{\sqrt{3}} & \frac{1}{\sqrt{3}} & \frac{1}{\sqrt{3}} \end{bmatrix}$ ←330a Gyro GB $\quad C_R^{GB} = \begin{bmatrix} \frac{1}{\sqrt{6}} & -\frac{1}{\sqrt{6}} & -\sqrt{\frac{2}{3}} \\ \frac{1}{\sqrt{2}} & \frac{1}{\sqrt{2}} & 0 \\ \frac{1}{\sqrt{3}} & -\frac{1}{\sqrt{3}} & \frac{1}{\sqrt{3}} \end{bmatrix}$ ←330b Gyro GC $\quad C_R^{GC} = \begin{bmatrix} -\frac{1}{\sqrt{6}} & -\frac{1}{\sqrt{6}} & -\sqrt{\frac{2}{3}} \\ \frac{1}{\sqrt{2}} & -\frac{1}{\sqrt{2}} & 0 \\ -\frac{1}{\sqrt{3}} & -\frac{1}{\sqrt{3}} & \frac{1}{\sqrt{3}} \end{bmatrix}$ ←330c Gyro GD $\quad C_R^{GD} = \begin{bmatrix} -\frac{1}{\sqrt{6}} & \frac{1}{\sqrt{6}} & -\sqrt{\frac{2}{3}} \\ -\frac{1}{\sqrt{2}} & -\frac{1}{\sqrt{2}} & 0 \\ -\frac{1}{\sqrt{3}} & \frac{1}{\sqrt{3}} & \frac{1}{\sqrt{3}} \end{bmatrix}$ ←330d $$\begin{bmatrix} Z^{GA} \\ Z^{GB} \\ Z^{GC} \\ Z^{GD} \end{bmatrix} = \frac{1}{\sqrt{3}} \begin{bmatrix} 1 & 1 & 1 \\ 1 & -1 & 1 \\ -1 & -1 & 1 \\ -1 & 1 & 1 \end{bmatrix} \begin{bmatrix} X^R \\ Y^R \\ Z^R \end{bmatrix} \equiv C_R^G \begin{bmatrix} X^R \\ Y^R \\ Z^R \end{bmatrix}$$ ←332a where
$$C_R^G = \frac{1}{\sqrt{3}} \begin{bmatrix} 1 & 1 & 1 \\ 1 & -1 & 1 \\ -1 & -1 & 1 \\ -1 & 1 & 1 \end{bmatrix}$$ ←332b

FIG. 9

SELF CALIBRATING GYROSCOPE SYSTEM

TECHNICAL FIELD

This invention relates generally to gyroscope systems, and more particularly to gyroscope systems having a plurality of gyroscope devices operating cooperatively in a redundant array with facilities for self calibration.

BACKGROUND

A hemispherical resonator gyroscope (HRG) is a type of gyroscope that employs a hemispherically shaped resonator (as opposed to a rotating wheel) to sense angular displacement. The HRG is a species of the group of Coriolis vibratory gyroscopes, and in particular is a "Class II" Coriolis vibratory gyroscope, members of which are geometrically symmetrical about their sensing or input axes and have degenerate, or nearly identical, resonant frequencies for the vibrations along the principal elastic axes.

An HRG generally comprises a hemispherical resonator symmetric about an input or sense axis. The resonator may be integrally formed with a supporting stem that is generally collinear with the sense axis. The resonator is typically caused to vibrate by applying an oscillating forcing signal at a frequency near the resonant frequency of the resonator. The signal may be an electrical signal and may be coupled to the resonator electrostatically. The forcing signal sets up a standing wave flex pattern, which is generally stationary when the angular rate about the input axis is zero, but which tends to rotate when the angular rate about the input axis is non-zero.

Angular displacement of the gyroscope, or its angular rate, with respect to the input axis, may be sensed by observing the flex pattern, which manifests nodes of minimum vibration amplitude, and anti-nodes of maximum vibration amplitude. HRGs may operate in open-loop and closed-loop modes. In the open-loop mode, the flex pattern is allowed to rotate, and its position or rate of rotation is sensed as a measure of the angular displacement or angular rate. In the closed-loop mode, a control system adjusts the forcing signal so as to maintain the flex pattern aligned in a chosen orientation with respect to the resonator, despite angular displacement of the gyroscope. Angular rate is measured by comparing the forcing signal required to maintain the chosen alignment of the flex pattern against a stable reference signal. Angular displacement may be obtained by integrating the rate signal. In the closed-loop mode, the control system provides a force to realign or "rebalance" the flex pattern to the chosen orientation, in the presence of an angular displacement or rate that would otherwise cause the flex pattern to shift. Accordingly, the closed-loop mode is sometimes referred to as the "force-to-rebalance" mode.

Although HRGs are generally considered to perform well, their performance is limited by several errors unless those errors are corrected. A first error relates to the tendency of the flex pattern to drift toward a drift axis defined by the geometry of the HRG apparatus. The drift tendency may be caused by imperfections in the hemispherical shape of the resonator, the presence of the electrodes, transducers, or other signal coupling devices, and other anomalies. The drift tendency is interpreted by the control system as an angular rate and therefore constitutes a bias error. A second error relates to imperfection in the effective gain of the rate-measuring signal processing system used to control the gyroscope and to furnish a rate signal from the gyroscope. Any discrepancy in the effective gain of this signal processing, including variation in sensor gain, amplifier gain, or the like, results in a scale factor error. These discrepancies or variations may occur due to device aging, temperature variation, radiation exposure, and other factors.

The scale factor error described above relates to the gyroscope control system and the associated forcing and measuring signal processing system. The resonator itself exhibits a different "geometric" scale factor which is dependent only on the geometry of the resonator—i.e., its hemispherical shape. The geometric scale factor remains nearly invariant over temperature, size, diameter, thickness, and elastic modulus of the resonator.

In some applications, scale factor and bias errors of a gyroscope system might be corrected manually by calibrating the gyroscope system during manufacturing, testing, or in a subsequent calibration step. However, in other applications, such calibration may not be feasible. For example, in space vehicle applications, the vehicle may not be reachable after launch. In other applications, the mission time may be so brief, or the factors producing the errors may vary so rapidly, that any initial calibration soon becomes stale, and manual recalibration is not feasible. Also, manual recalibration may be too expensive.

Thus, the need exists for apparatus and methods for use with gyroscope systems to allow self calibration to minimize at least scale factor and bias errors.

SUMMARY

A self-calibrating gyroscope system comprises a plurality of gyroscope units in a dimensionally redundant configuration, and an appropriate system for controlling the gyroscopes, performing certain calibration functions, and producing compensated rate estimates from the gyroscopes for the axes of interest. In general, in order to obtain rate estimates in three dimensions, a minimum of four non-coaxial gyroscopes are required, such that rate estimates in three dimensions are available when one of the gyroscopes is unable to furnish rate estimates. The control system comprises a bias error determination unit which employs a mode reversal technique to estimate bias error, and a scale factor determination unit which employs a random closed-loop scale factor estimation technique to estimate scale factor error. The control system further comprises a rate control loop and error compensation unit which receives a rate estimate from a gyroscope of interest, receives bias error and scale factor estimates from the corresponding error determination units, and compensates the rate estimate of the gyroscope of interest accordingly. The rate control and error compensation unit also provides a forcer feedback signal to control the position of the resonator flex pattern.

The mode reversal bias error determination unit measures bias error by operating the gyroscope in a first mode, in which the resonator flex pattern is forced to align with a first control axis displaced from the resonator's drift axis, in which mode the gyroscope rate estimate is recorded, and then operating the gyroscope in a second mode, in which the resonator flex pattern is forced to align with a second control axis also displaced from the drift axis, in which mode the gyroscope rate estimate is again recorded. The bias error in each mode exhibits approximately the same magnitude, but opposite sign. Accordingly, bias error is extracted by an arithmetic process.

The random closed-loop scale factor (RCLSF) determination unit measures scale factor error by shifting, in an essentially random manner de-correlated with the movement of the gyroscope system, the position of the control axis that defines the intended position of the resonator flex pattern. The forcers are instructed to move the flex pattern consistent with the movement of the control axis. Scale factor error is manifested as a discrepancy between the measured position of the resonator flex pattern and its intended trajectory. If dimensionally redundant gyroscopes are provided, the scale-factor determination unit may also use a rate estimate for the axis of the gyroscope of interest, derived from the rate estimates of the other gyroscopes, to measure scale factor error. Although the term "random" is used, the actual pattern of shifting the control axis is preferably a pseudo-random sequence constrained to possess desired characteristics, and may be precalculated.

In operation, according to a method for use in conjunction with the gyroscope system, gyroscopes are selected in turn for calibration. The selected gyroscope is taken offline. Navigation continues based on rate estimates from other operating gyroscopes. The mode reversal bias determination unit obtains an estimate of bias error for the selected gyroscope. The mode reversal process briefly disrupts the operation of the gyroscope, so it cannot be used to produce rate estimate during this calibration step. The RCLSF calibration process does not interfere with the operation of the gyroscope, so it may be executed continuously, or during the selected calibration interval for each gyroscope in turn.

DESCRIPTION OF THE DRAWINGS

Features of example implementations of the invention will become apparent from the description, the claims, and the accompanying drawings in which:

FIG. 4 is a diagram depicting additional features of the geometry of two units of the example arrangement of gyroscope units shown in FIGS. 2-3;

FIG. 5 is a simplified cross-section view of a portion of a hemispherical resonator gyroscope, showing the resonator thereof, for use with the gyroscope system 100 and gyroscopes of FIGS. 1-4, taken along a plane collinear with the axis of symmetry of the resonator;

FIG. 6 is a simplified cross section view of a portion of a hemispherical resonator gyroscope, showing the resonator and ancillary elements thereof, for use with the gyroscope system 100 and gyroscopes of FIGS. 1-5, taken along a plane perpendicular with the axis of symmetry of the resonator;

FIG. 9 depicts mathematical relationships for use in translating rate information between reference axes and the axes of individual gyroscopes of FIG. 1-4;

DETAILED DESCRIPTION

Figure 1:
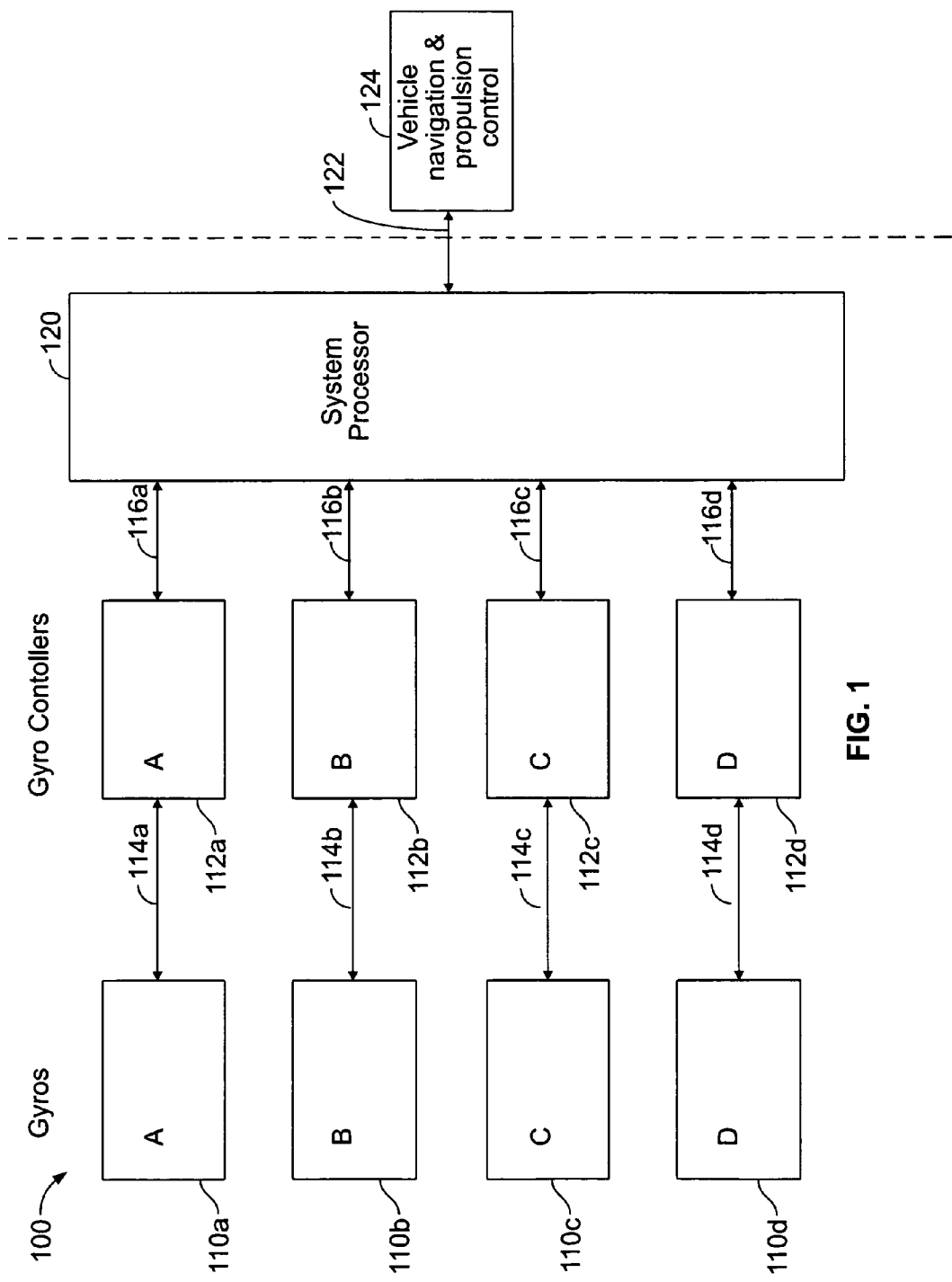
FIG. 1 is an overview block diagram of an example gyroscope system 100 constructed according to an aspect of the present invention.

FIG. 1 is an overview block diagram of an example embodiment of a gyroscope system 100 constructed according to an aspect of the present invention. Gyroscope system 100 may be implemented, for example, using a cluster of hemispherical resonator gyroscopes, and a suitable control system.

A hemispherical resonator gyroscope (HRG) is a type of gyroscope that employs a hemispherical resonator (as opposed to a rotating wheel) to sense angular displacement. The HRG is a species of the group of Coriolis vibratory gyroscopes, and in particular is a "Class II" Coriolis vibratory gyroscope, members of which are geometrically symmetrical about their sensing or input axes and have degenerate, or nearly identical, resonant frequencies for the vibration along the principal elastic axis. The calibration techniques, and the general method of calibrating and operating a gyroscope system disclosed herein is not limited to HRGs, but may generally be applied to any Class II Coriolis vibratory gyroscope, and could, with modifications within the ken of one of skill in the art, be applied to other gyroscope types.

The gyroscope system 100 apparatus, control systems, and associated methods described herein are depicted in the application environment of a gyroscope system employing multiple gyroscopes and a suitable control system, by way of example but not limitation, to show how challenges encountered in calibrating a system of gyroscopes may be overcome. However, one of skill in the art will appreciate that the control systems could also be advantageously applied to other gyroscope applications, and more generally to other gyroscope types, in environments not limited to clusters of HRG gyroscopes, without modification or with modifications within the ken of a person of skill in the art, consistent with the spirit of the invention.

The present application relates to gyroscopes and control systems therefor, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the gyroscope and control system arts, various signal leads, busses, data paths, data structures, channels, buffers, message-passing interfaces, free-space optical paths, fiber optical paths, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

As best seen in FIG. 1, the example gyroscope system 100 comprises a plurality of gyroscopes 110a-110d, a plurality of gyroscope controllers 112a-112d respectively connected to the gyroscopes 110a-110d via signal paths 114a-114d, and a gyroscope system processor 120 respectively connected to the gyroscope controllers 112a-112d via signal paths 116a-116d. The system processor 120 provides, inter alia, rate estimates useful for navigation, position reporting, or similar functions to a consuming device via signal path 122. For example, in vehicular applications, which includes but is not limited to spacecraft, the consuming device may be a vehicle navigation and propulsion control 124. The rate estimates may be provided with respect to the axes of the individual gyroscopes 110a-110d, or may be provided with respect to standard, orthogonal axes (e.g., X, Y, and Z). The latter rates are sometimes referred to as "box rates". The system processor 120 may also process signals from other sensors, including inertial sensors (not shown), and furnish to the consuming device information in addition to angular rates.

The depiction in FIG. 1 of plural distinct gyroscope controllers 112a-112d and a distinct system processor 120 reflects traditional practice in the art, in which low-level control functions, which may include driving the flex pattern of a gyroscope resonator to align with a selected control point or control axis, are performed by per-gyroscope controllers, while higher level functions, including calibration or compensation of rate estimates, and translation of rate estimates from one system of coordinates to another, are performed by a higher level system processor. However, it is not required that this specific organization of elements, or this specific distribution of functions to such elements, be employed. Accordingly, the control functions of the gyroscope system 100 will hereinafter be described generally as being performed by a gyroscope control system 200 (FIG. 7), without identifying the physical units in which such function may be realized. Further, the control system 200 may be implemented using any appropriate control technology, including but not limited to any one or more of computers, microprocessors, digital signal processors, synchronous digital logic, asynchronous digital logic, and analog processing, control and computation.

Figure 2:
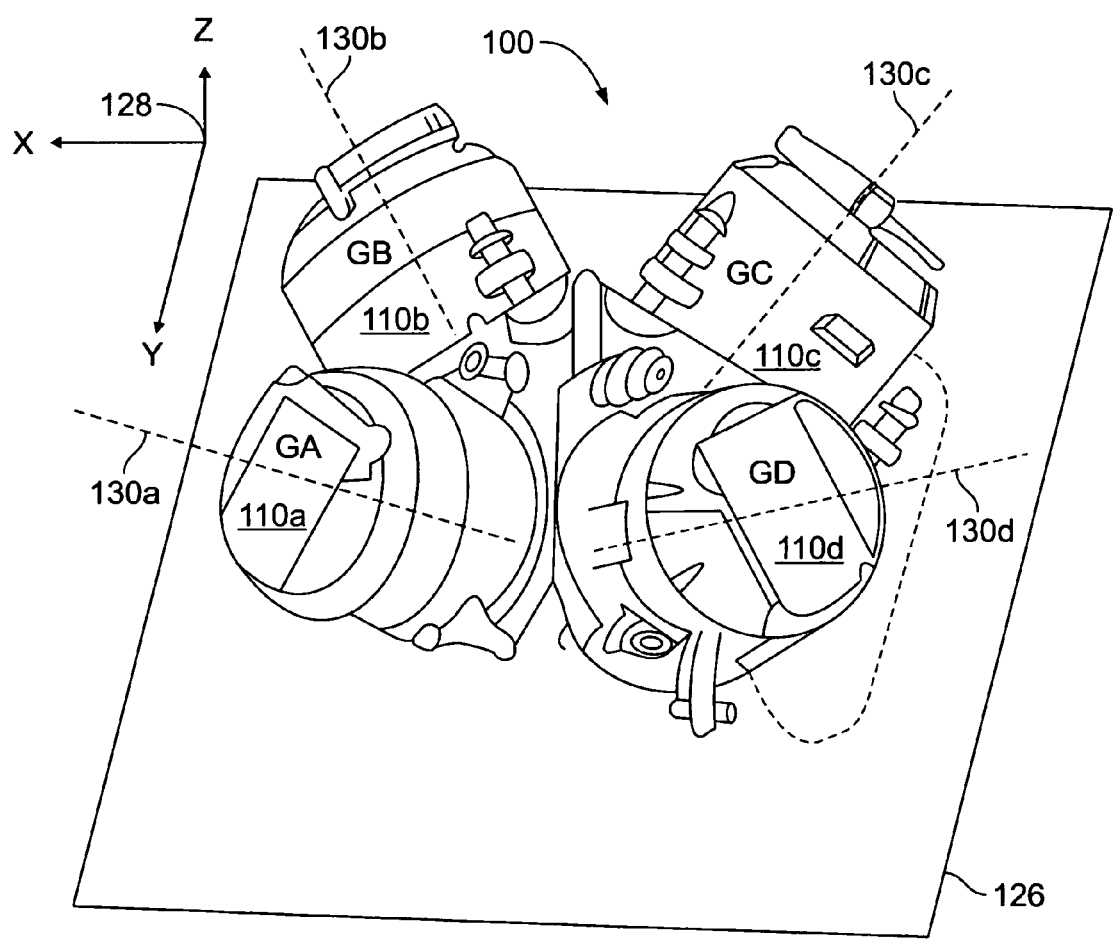
FIG. 2 is a simplified perspective view of an example arrangement of gyroscope units for use with the gyroscope system 100 of FIG. 1.

FIG. 2 is a simplified perspective view of an example arrangement or cluster of gyroscope units for use with the gyroscope system 100 of FIG. 1. The gyroscopes 110a-110d are mechanically secured to a gyroscope cluster block, fixture, platform, or substrate 126. Each of gyroscopes 110a-110d has a corresponding input or sense axis 130a-130d about which it senses angular displacement or its rate. The fixture 126 preferably allows the gyroscopes 110a-110d to be secured in adjustable positions such that a preferred angular relationship between the gyroscope axes 130a-130d may be realized. Although three mutually non-parallel gyroscopes are usually sufficient to obtain rates about three axes needed for three-dimensional navigation, according to an aspect of the present invention, at least one redundant gyroscope is provided to allow three-non-coaxial rate estimates to be furnished when any one gyroscope is unavailable for navigation. This may occur when a gyroscope is undergoing calibration according to an aspect of the invention. Accordingly, gyroscope system 100 is depicted herein as having four gyroscopes 110a-110d, other number of gyroscopes could also be used, depending on mission requirements. The term "calibration" in its various forms is used herein to refer to adjustment of the gyroscope system output toward a more accurate result by reducing the effect of correctable error. Standard, orthogonal axes X, Y, and Z are depicted extending from an origin 128. Although the axes of gyroscopes 110a-110d are not necessarily aligned with or parallel to the standard axes, rate estimates about the gyroscope axes may be transformed into rate estimates about the standard axes (or other sets of mutually non-parallel axes), as is known in the art.

Figure 3:
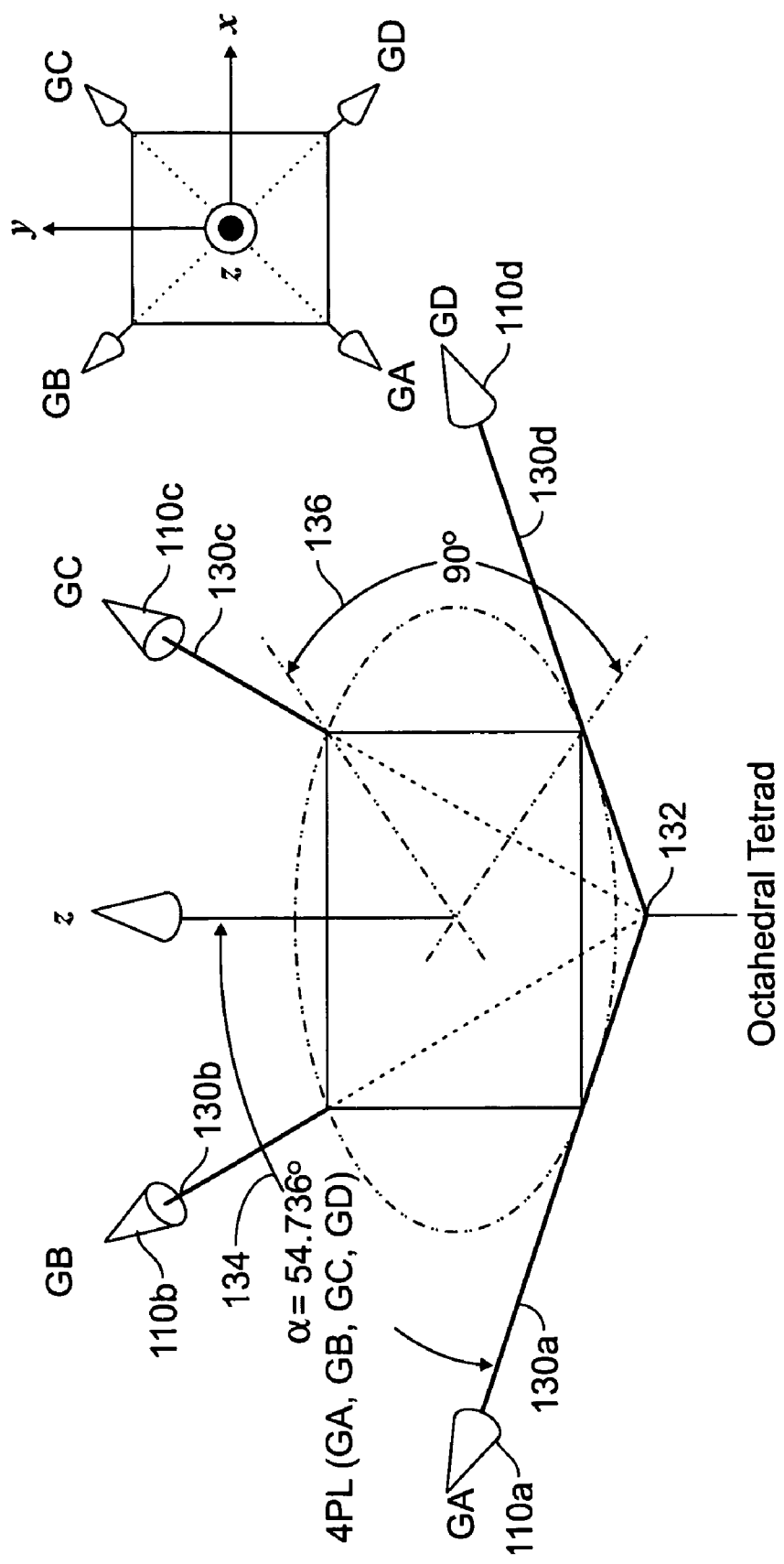
FIG. 3 is a diagram depicting the geometry of the example arrangement of gyroscope units of FIG. 2.

FIG. 3 is a diagram depicting the geometry of the example arrangement of gyroscope units of FIG. 2. As best seen in FIG. 3, the gyroscopes are arranged with their axes 130a-130d forming an octahedral tetrad. The octahedral tetrad arrangement is characterized in that each of four gyroscope axes 130a-130d extends from an origin 132 and forms an angle 134 of 54.7356 degrees with respect to a defined Z axis, and when the four gyroscope axes 130a-130d are projected onto a plane normal to the Z axis (e.g., the X-Y plane), projections of adjacent axes 130a-130d are perpendicular to each other, as shown by 90-degree angle 136.

Any mutually non-parallel arrangement of redundant gyroscopes could theoretically be used, because rate estimates with respect to the axes of such an arrangement may be transformed mathematically to rate estimates with respect to any other set of axes. However, the octahedral tetrad arrangement of FIGS. 2-3 is believed to be optimal for a system in which either three or four gyroscopes may be available at various times. This particular arrangement allows rate estimates from all four or any three gyroscopes to be readily transformed into rate estimates about standard axes or any axis corresponding to one unavailable gyroscope, and it is believed that transformation errors are small compared to other possible arrangements. However, other arrangements could also be used.

FIG. 4 is a diagram depicting additional features of a geometry 138 of two units of the example arrangement of gyroscope units shown in FIGS. 2-3. First and second gyroscopes 110a and 110b are shown. Third and fourth gyroscopes 110c and 110d are omitted for clarity.

FIG. 5 is a simplified cross-section view of a portion of a hemispherical resonator gyroscope, showing the resonator thereof, for use with the gyroscope system 100 and gyroscopes 110a-110d of FIGS. 1-4, taken along a plane collinear with the axis of symmetry 130 of the resonator. FIG. 6 is a simplified cross section view of a portion of a hemispherical resonator gyroscope, showing the resonator and ancillary elements thereof, for use with the gyroscope system 100 and gyroscopes of FIGS. 1-5, taken along a plane perpendicular with the axis of symmetry 130 of the resonator.

An HRG generally comprises a hemispherical resonator 144 symmetric about an input or sense axis 130. The resonator 144 may be integrally formed with a supporting stem 142 that is generally collinear with the sense axis. The resonator 144 may be enclosed in a gyroscope housing and support structure 140. The resonator is typically caused to vibrate by applying an oscillating forcing signal at a frequency near the resonant frequency of the resonator. The signal may be an electrical signal and may be coupled to the resonator electrostatically using one or more electrodes or transducers such as 158 and 160.

An example vibration or flex pattern of the distal portion of the resonator 144 is depicted in FIG. 6, with the amplitude of the vibration greatly exaggerated. Vibration of the resonator is excited by one or more of electrodes or transducers 158 and 160 at a frequency very close to the resonator's resonant frequency. The vibration of the resonator 144 forms a standing wave vibration pattern that remains stationary, provided that the angular rate about the input axis 130 is zero and any excitation or forcing signals applied do not force displacement. If an angular rate about the input axis is non-zero, the vibration pattern will tend to rotate.

Points of minimum vibration amplitude are referred to as "nodes", e.g. 156, with which a nodal axis 152 is aligned. Points of maximum vibration amplitude are referred to as "anti-nodes", e.g., 154, with which an anti-nodal axis 150 is aligned. Transducer 160 is adjacent node 156, and transducer 158 is adjacent anti-node 154. Depending on the vibration mode established by the geometry of the resonator 144 and the frequency of any excitation signals applied by transducers 158 and 160, there may be more or fewer nodes and antinodes than the four of each shown in FIG. 6.

Although a node and anti-node are depicted as aligned with transducers 160 and 158, respectively, the vibration pattern will naturally rotate away from those points in response to rotations of the gyro case along the gyro sensing axis. Thus, if the angular rate about axis 130 is non-zero, the vibration pattern may tend to rotate, but can be forced to remain in a desired position. This can be accomplished by applying a voltage to the nodal forcing electrodes with the proper phasing relative to the flexing pattern of the gyro resonator. The angular rate may be inferred from the magnitude of the signals required to maintain the vibration pattern in the desired position. A gyroscope operating in this fashion is said to be operating in the "closed-loop" mode.

Figure 7:
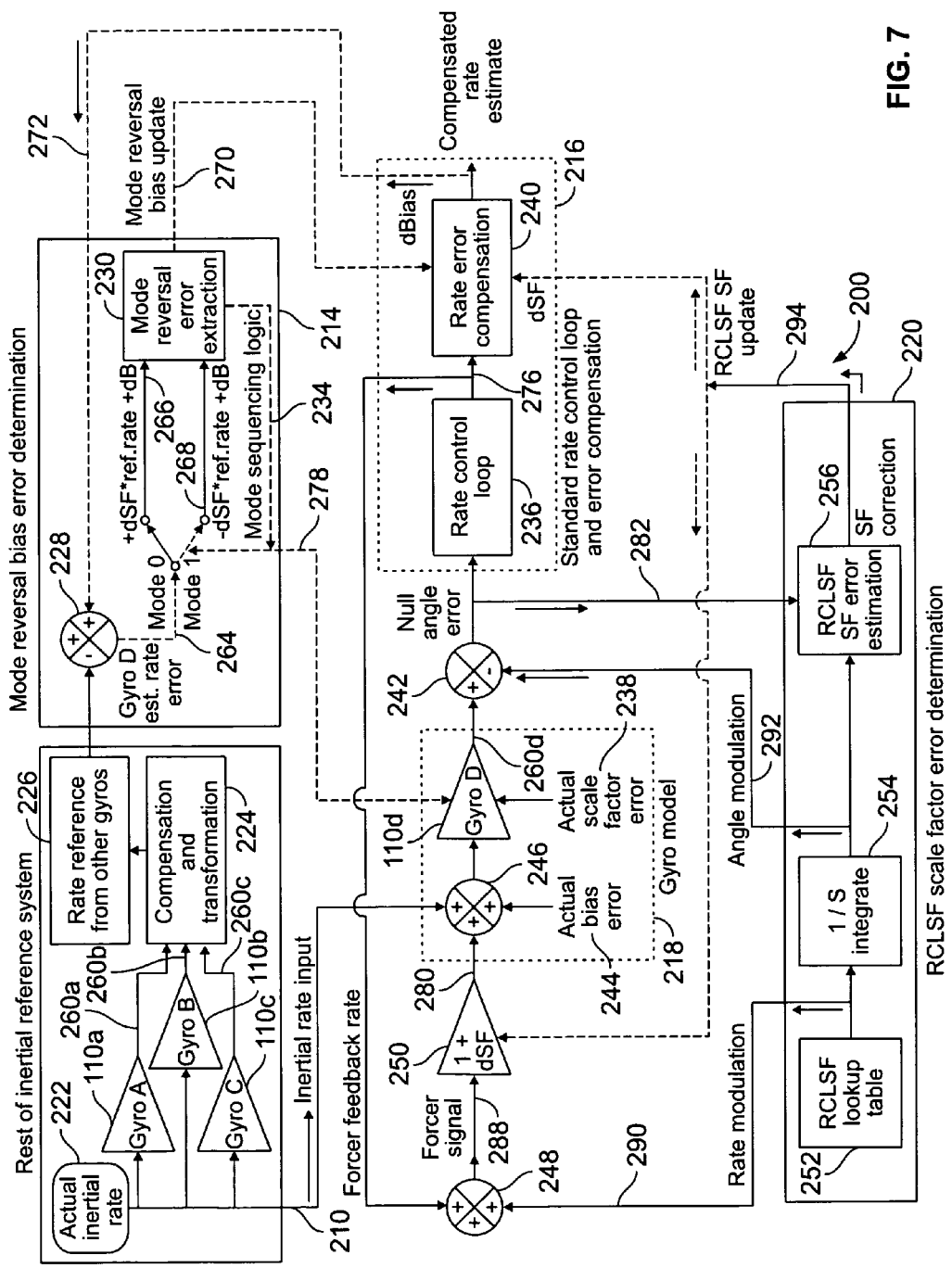
FIG. 7 is a block diagram of an example gyroscope control system 200 for use with the gyroscope system 100 of FIG. 1.

FIG. 7 is a block diagram of an example gyroscope control system 200 constructed according to an aspect of the present invention for use with the gyroscope system 100 of FIGS. 1-6. FIG. 7 depicts the elements of the control system 200 needed to control a single one 110*d* of the gyroscopes 110*a*-110*d*. The contents of box 210 represent elements generally considered to be outside of the control system 200 for gyroscope 110*d*, and may be considered to be remaining elements of the gyroscope system 100, or, more generally, of an inertial reference system. However, elements within box 210, and the signals or information box 210 provides, may be needed for control system 200 to operate properly or optimally. Although control system 200 is described herein in an environment in which it controls a single one 110*d* of the gyroscopes, the remaining gyroscopes could be controlled by replicating the facilities of control system 200. Alternatively, the facilities of control system 200 could, with minor modifications, be shared among the several gyroscopes 110.

In overview, control system 200 further comprises a mode reversal bias determination unit 214, a random closed loop scale factor (RCSLF) error determination unit 220, standard rate control loop and error compensation unit 216, and a gyroscope model 218. The mode reversal unit 214 and RCSLF unit 220 produce estimates of bias error and scale factor error respectively which are furnished to the rate control and error compensation unit 216. The gyroscope model 218 represents the actual physical gyroscope which furnishes raw rate information to the rate control and error compensation unit 216. That unit produces a feedback signal used to control the gyroscope, and from which an uncompensated gyroscope rate output signal is derived. In addition, unit 216 uses the bias error and scale factor error signals received from mode reversal unit 214 and RCSLF unit 220 respectively to produce a compensated (or calibrated) rate estimate 272 for delivery to a consumer, such as navigation and propulsion control 124 (FIG. 1). The term "calibration" in its various forms is used herein to refer to adjustment of the gyroscope system output toward a more accurate result by reducing the effect of correctable error.

Each of the major functional elements of control system 200 will be described in turn, in greater detail.

Box 210 comprises the remaining gyroscopes 110*a*-110*c* which provide compensated output signals 260*a*-260*c* to a transformation unit 224. Compensation & transformation unit 224 uses the rate information from the other gyroscopes to produce a rate reference signal 226 representing the angular rotation rate about the axis of the gyroscope 110*d* being controlled. If gyroscope 110*d* is operating (i.e., not offline for calibration or out-of-service due to fault), the rate estimate from gyroscope 110*d* should closely match the rate reference information for that gyroscope furnished by compensation and transformation unit 224. Box 210 further depicts an item 222 labeled "actual inertial rate". This is not, strictly speaking, a signal; it is the actual physical inertial/angular rate experienced by each of the gyroscopes 110*a*-110*d* and is among the "inputs" which influence the output of the gyroscopes 110*a*-110*d*. Because gyroscope 110*d* also experiences an inertial/angular rate, rate 222 is also shown as an input to the model 218 of gyroscope 110*d*. The rate reference signal from the "other" gyroscopes 226 is furnished to the mode reversal unit 214.

The mode reversal bias determination unit 214 comprises a summer 228, a mode reversal bias error extraction element 230, and mode sequencing logic 234. The summer 228 receives the rate reference signal 226 from box 210 and the compensated rate estimate signal 272 from rate control and error compensation unit 216 and subtracts signal 226 from signal 272 to derive a estimated rate error signal 264.

Mode sequencing logic 234 furnishes a mode control signal 234, which is supplied to gyroscope 110*d* and which selects between first and second modes of operation of the gyroscope 110*d* and the bias error extractor 230. In the first mode the gyroscope 110*d* resonator flex pattern is forced to align with a first control axis displaced from the resonator's drift axis, and the bias error extractor 230 receives an estimated rate error signal equivalent to the bias error plus the product of the reference rate 260 and a scale factor estimate 294. In the second mode the gyroscope 110*d* resonator flex pattern is forced to align with a second control axis displaced from the resonator's drift axis, and the bias error extractor 230 receives an estimated rate error signal equivalent to the bias error minus the product of the reference rate 260 and a scale factor estimate 294. The bias error extractor 230 uses these signals, acquired at different times separated by the short interval required to reverse the resonator mode, to produce a mode reversal bias error correction signal 270. When the mode sequencing logic has the gyro going from mode 0 to mode 1 the forcers, instead of supplying a signal to hold the pattern fixed, will apply a properly sequenced signal so that the flex pattern moves from having maximum amplitude along one electrode to having it along the other electrode. When in the first position the rate output from the gyro is as shown in 266 with the output of the summer 228 going to the mode 0 input 266 for use by the bias error extractor 230. When switched changes to mode 1 the output of the summer 228 is moved to the mode 1 input 268 of the bias extractor 230. Because of the physics of the gyro, the summer 228 output in mode 0 will be at the value dB+dSF*Input Rate, with dB being the error in the estimate of the bias and dSF being the error in the estimate of the scale factor. Similarly when in mode 1 the summer 228 output will be at the value dB-dSF*Input Rate. A method 350 for use in conjunction with the mode reversal unit 214 is described in conjunction with FIG. 10. The mode reversal unit 214 and associated methods may be realized as further disclosed in U.S. patent application Ser. No. 11/499,957, published under document number 2007/0039386, and in U.S. Pat. No. 7,103,477 [self-calibration for an inertial instrument based on real time bias estimator], the contents of which are incorporated herein by reference.

Random closed loop scale factor (RCSLF) error determination unit 220 comprises a random signal generator 252, an integrator 254, and a RCLSF scale factor error estimation element 256. The random signal generator 252 produces a rate modulation signal 290 to summer 248, to be used to shift the position of the of the flex pattern of the resonator in gyroscope 110*d* in a random manner. Although the term random is used here, the signal and manner of shifting the flex pattern need not actually be random, and, in fact, a pseudo-random signal may be preferable. The intent of using a random or pseudo-random signal to control the pattern shift is that the pattern shift be de-correlated from any physical or environmental inputs which the gyroscope 110*d* is intended to sense. As described further in greater detail, the pseudo-random signal may be designed to satisfy certain constraints, including: a mean of zero over a relatively short plurality of periods; no dominant frequency content; contiguous duplicate values limited in number; and the integral of the signal must not exceed the dynamic range of subsequent processing elements. The random signal generator 252 may be realized using a lookup table containing pre-calculated values satisfying these constraints; the values from the table may be clocked out using any appropriate means.

The rate modulation signal 290 is also furnished to integrator 254 which integrates the rate to produce an angle modulation signal 292. The integrator 254 effectively models the commanded behavior of the gyroscope 110*d* with respect to the position of the flex pattern. Thus the angle modulation signal 292 is supplied to a summer 242 where it is subtracted from the gyroscope output signal 260. The null angle error signal 282 from summer 242 thus characterizes the difference between the commanded behavior of the gyroscope 110*d* and its actual behavior, which difference is at least partially the result of scale factor error. The angle modulation signal 292 and the null angle error signal 282 are furnished to scale factor error estimator 256 which determines an estimated scale factor error and produces a RCLSF scale factor correction signal 294, which is furnished to an amplifier 250 that drives the gyroscope 110*d* and to rate error compensator 240 of rate control and error compensation unit 216. The operation of the RCSLF unit 220 is described further in greater detail in connection with FIGS. 11-16.

A chain of amplifiers and summers feeds a number of signals to gyroscope 110*d*. The rate modulation signal 290 from RCSLF unit 220 and the forcer feedback rate signal 276 from rate control and error compensation unit 216 are supplied to a summer 248. The summer 248 produces a modulated forcer feedback signal 288 which is furnished to forcer feedback amplifier 250. Scale factor correction signal 294 from RCSLF unit 220 is supplied to the gain input of amplifier 250. Thus, the scale factor correction signal 294 adjusts gain of amplifier 250 and therefore adjusts the scaling of the modulated forcer feedback signal 288. The output of amplifier 250 is a scale-adjusted forcer feedback signal 280 which is furnished to gyroscope model 218.

Gyroscope model 218 depicts an operational model of the gyroscope 110*d*, to aid in understanding how the gyroscope 110*d* may be expected to respond to control signals, physical/environmental inputs, and sources of error. As depicted, gyroscope model 218 includes a summer 246 and a gyroscope 110*d*. Of course, the summer 246 does not actually exist. Its appearance in gyroscope model 218 signifies that the gyroscope 110*d* receives the scale-adjusted feedback signal 280 directly, and that the gyroscope's response is linearly dependent on that signal, the actual bias error 244 exhibited by the gyroscope 110*d*, and the actual inertial rate 222 experienced by the gyroscope.

Gyroscope 110*d* receives the mode control signal 234, and is further affected by the actual scale factor error 238. The gyroscope 110*d* produces an output 260 which is furnished to summer 242. The summer 242 produces a null angle error signal 282 which is furnished to RCSLF unit 220 and rate control and error compensation unit 216. By removing the angle modulation signal 292 from the signal to the Rate Control Loop 236, the noise induced by the RCLSF modulation on the Rate Control Loop output 276 will be minimized. This will result in the output from the gyro 272 to the consuming device having a better signal to noise ratio.

The rate control and error compensation unit 216 comprises a rate control loop 236 and a rate error compensation element 240. The rate control loop 236 receives the null angle error signal 282 and responsively produces a forcer feedback rate signal 276 which is furnished to both summer 248 and rate error compensator 240. The rate error compensator 240 receives the forcer feedback rate signal 276, the bias error correction signal 270, and the scale factor correction signal 294 and produces a compensated rate estimate signal 272. Compensated rate estimate signal 272 is furnished to mode reversal unit 214 and is also furnished to consuming device, such as navigation and propulsion control 124, as the rate estimate about gyroscope axis 130*d*. Both the Bias and SF errors are slowly varying processes, changing mainly due to temperature variations in the gyros and/or electronics. The design of both the Bias and the SF error estimation algorithms may take advantage of this by using updates the respond to changes with very long time constants, typically on the range from 10's of minutes to several hours. These long time constants would allow the estimator to ignore short term aberrations in the observed data by lowering the weighting of individual measurements. This statistically minimizes the effects of the short term errors allowing the estimation routine to track only the true gyro errors. The bandwidth for the RCLSF algorithm should be a high as practically possible within the constraints of the forcer update rate and processor calculation capability. This would spread the spectral energy of the null updates across the widest possible frequency band, minimizing the interactions with the actual vehicle motion inputs. For example, if gyro data were acquired at a rate of 1 kHz, and the forcer commands were also updated at that rate, then the null position should also be updated at the 1 kHz rate. If however, system limitations dictate that the forcer commands be sent every $5^{th}$ measurement, then a 200 Hz update rate would be used. The self calibration performance could be further enhanced by making the estimator to adaptive, changing the time constant based upon the measurements of temperature changes and/or gyro rate inputs. For example it could decrease the time constants of the Bias estimator when temperature is changing or it may increase the time constant of the SF estimator when significant gyro input rates are measured. This may easily be done by increasing Kalman filter plant noise for the first case or increasing the filter measurement noise for the second. For some situations the updating of the Bias or SF estimation may be completely inhibited by freezing the current error estimate at that time until the situation changes. For the Bias estimation the updating would be inhibited when gyro input rates reached a threshold level (say>1°/sec). This freezing of the estimates would keep errors in reference gyros scale factor or sensing axis misalignment errors from corrupting the bias value. Similarly, the RCLSF estimator may be turned off during high rate inputs and at times when the stabilized vehicle could benefit from the decreases short term noise injected into the rate signals due to the null position modulation. If in a specific application the randomization of the null position creates unacceptable noise then the SF estimator could only be turned on while the gyro is off-line during, before or after bias mode reversals are completed. A further enhancement of the self calibration mechanization could be the use of logic that enables both Bias and SF estimation when the gyros sense that there is no motion and then deactivated when the vehicle moves. For precision strategic missile applications the compensators could be continuously on during the time when the vehicle is dormant, providing rate estimates with the maximum accuracy upon need. When mechanizing an RCLSF estimator so that it can be activated and deactivated during operation, the point at which the null shifting is deactivated is critical. When stopping, the integral of the pattern modulation must be at zero, otherwise the gyro will be left with a null offset creating an error in its output.

Figure 8:
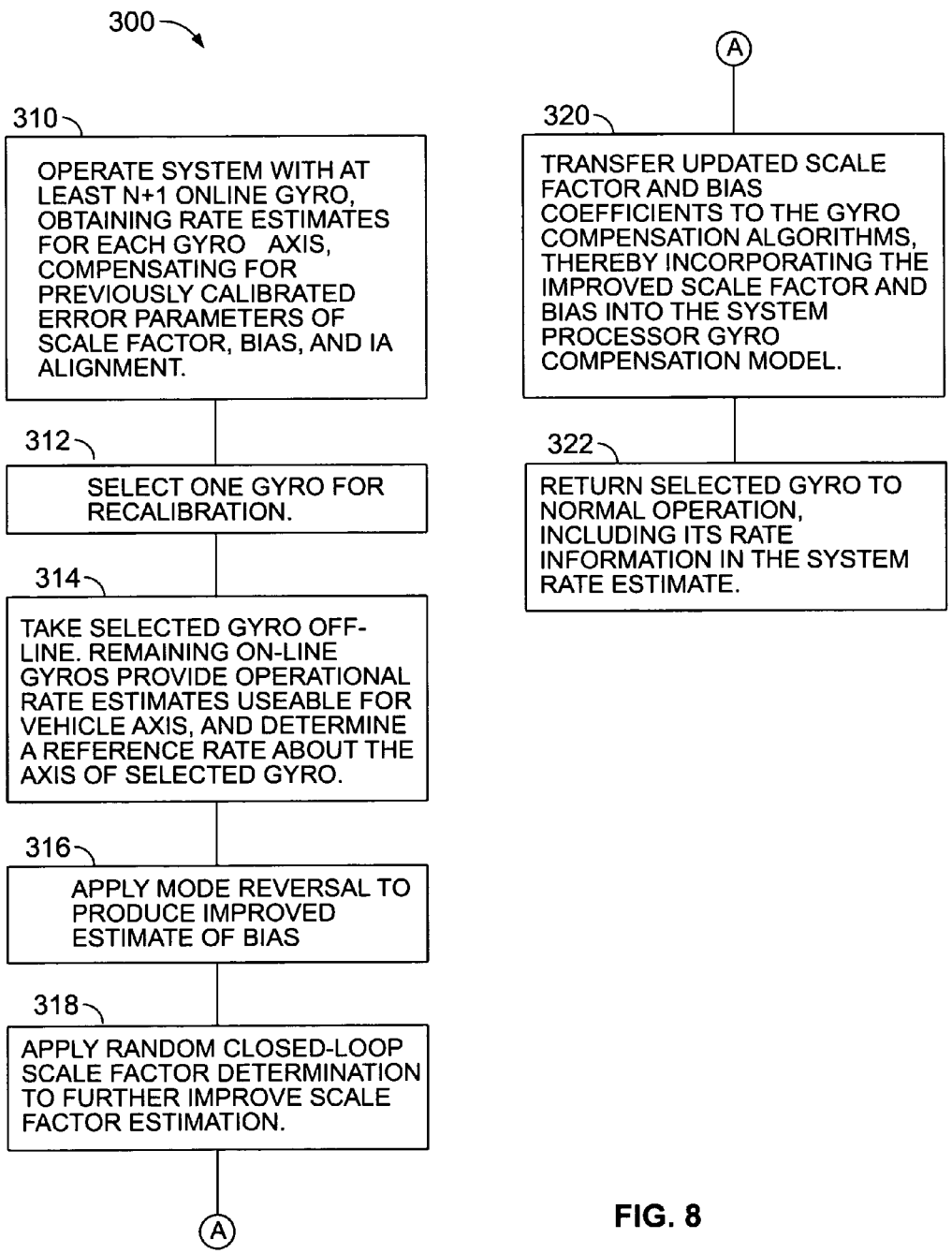
FIG. 8 is a flow diagram of an example method for use with control system 200 in calibrating the gyroscope system 100 of FIG. 1.

In accord with a further aspect of the invention, FIG. 8 is a flow diagram of an example method 300 for use with control system 200 in calibrating the gyroscope system 100 of FIG. 1. One of skill in the art will appreciate that the method may be used with the apparatus of FIGS. 1-7, but could also be used with other apparatus and with other gyroscope systems without departing from the spirit of the invention. Accordingly, some primary steps are presented in a generalized form that may not rely on the particular apparatus of FIGS. 1-7. It is noted in the description of certain steps and substeps that such steps may be performed by specific elements of the apparatus of FIGS. 1-7. The association of steps and apparatus is done by way of example but not limitation, and it is to be understood that these steps could be performed by other apparatus. Moreover, optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

In step 310, the system is operated with at least N+1 online gyroscopes (where N is the number of axes for which angular rates are required for navigation). Rate estimates are obtained for each gyroscope axis, compensating for previously calibrated error parameters of Scale Factor, Bias, and Input Axis Alignment. The activities of step 310 may be performed, for example, by one or more of the control system 200 of FIG. 7, the gyroscope controllers 112a-112d of FIG. 1, and the system processor 120 of FIG. 1.

In step 312, one gyroscope is selected for recalibration. In step 314, the selected gyroscope is taken off-line. The remaining on-line gyroscopes provide operational rate estimates useable for vehicle navigation, and are used to determine a reference rate about the axis of the selected gyroscope. When a gyroscope is "off-line" it means that the any rate estimates from that gyroscope shall not be used for navigation or for most other purposes. When a gyroscope is "on-line" it means that rate estimates from that gyroscope are available for navigation. The activities of step 312-314 may be performed, for example, by one or more of the control system 200 of FIG. 7, the gyroscope controllers 112a-112d of FIG. 1, and the system processor 120 of FIG. 1.

In step 316, Mode Reversal is applied to produce an improved estimate of Bias errors.

In step 318, Random Closed-Loop Scale Factor technique is applied to further improve Scale Factor estimation. The updated Scale Factor and Bias coefficients are transferred to the gyroscope compensation algorithms, thereby incorporating the improved Scale Factor and Bias into the system processor gyroscope compensation model. The activity of step 316 may be performed, for example, by one or more of the mode reversal unit 214, random closed loop scale factor (RC-SLF) error determination unit 220, and ancillary elements of control system 200, of FIG. 7.

In step 320, the selected gyroscope is returned to normal operation. The rate information produced by the newly-recalibrated gyroscope is included in the system rate estimate. Optionally, another gyroscope may be selected for calibration and the execution may continue at step 314.

The steps or operations described herein are just for example. There may be many variations to these steps or operations without departing from the spirit of the invention. For instance, the steps may be performed in a differing order, or steps may be added, deleted, or modified.

FIG. 9 depicts mathematical relationships for use in translating rate information between reference axes and the axes of individual gyroscopes of FIG. 1-4. Equations 330a-330d represent the respective transformation matrices ($C_R^{Gi}$) from reference (box) axes ($X^R$, $Y^R$, $Z^R$) to an individual gyroscope's axes ($X^{Gi}$, $Y^{Gi}$, $Z^{Gi}$, i=A, B, C, D). Since only the inputs to the sensing axes of the gyros are needed for these computations a single transformation matrix from the reference axes to the sensing axis of each of the four gyroscopes can be used. This matrix is shown in Equations 332a-332b. By multiplying the rates that are know in the "box frame" by transformation 332a & b, the result is the knowledge of the inertial acceleration along each gyro's sensing axis. The transformation matrix 332c which is represented as $$C_G^R = (C_R^{G^T} C_R^G)^{-1} C_R^{G^T}$$

conversely is used to transform accelerations known along each gyro sensing axis in "box frame' coordinates.

In accord with a further aspect of the invention, FIG. 8 is a flow diagram denoting the full self calibrating system of an example method 350[300] for use with control system 200 in calibrating a selected gyroscope to improve a estimates of bias error and scale factor error affecting the gyroscope.

One of skill in the art will appreciate that the method may be used with the apparatus of FIGS. 1-7, but could also be used with other apparatus and with other gyroscope systems without departing from the spirit of the invention. Accordingly, some primary steps are presented in a generalized form that may not rely on the particular apparatus of FIGS. 1-7. It is noted in the description of certain steps and substeps that such steps may be performed by specific elements of the apparatus of FIGS. 1-7. The association of steps and apparatus is done by way of example but not limitation, and it is to be understood that these steps could be performed by other apparatus. Moreover, optional substeps may be omitted or replaced by other specific method steps that implement or embody the function of the primary step. Although discrete steps are mentioned, it will be understood by one of skill in the art that in some embodiments, the functions defined in the steps may be performed as continuous processes.

Figure 10:
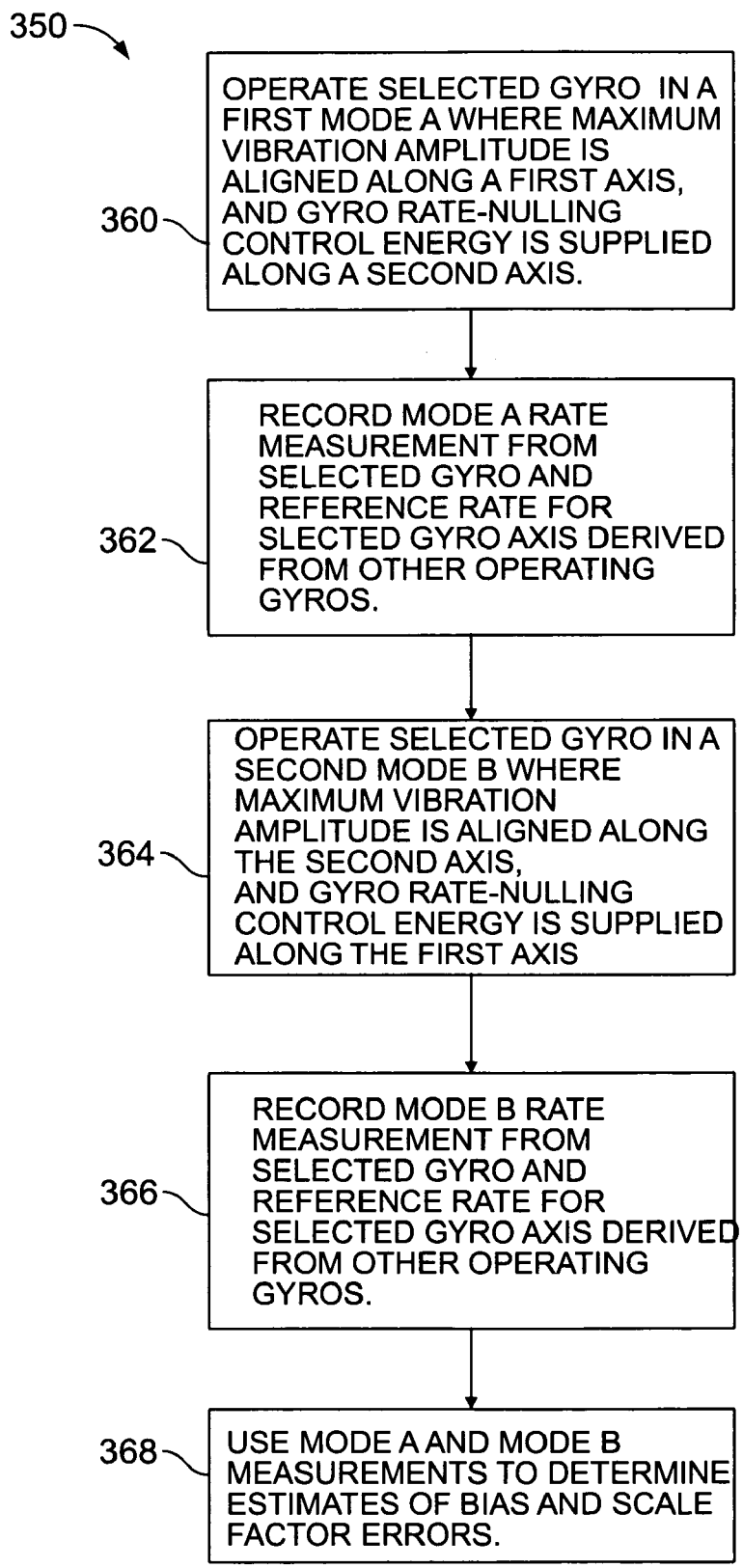
FIG. 10 is a flow diagram of an example method for use with control system 200 in performing a scale factor determination using a mode reversal technique.

In accord with a further aspect of the invention, FIG. 10 is a method 350 for use with control system 200 in calibrating a selected gyroscope. Method 350 is an expansion of step 316 of method 200 that describes the bias mode reversal technique to improve a estimates of bias error affecting the gyroscope. In step 360, a selected gyroscope is operated in a first mode A where maximum vibration amplitude is aligned along a first axis, and gyroscope rate-nulling control energy is supplied along a second axis.

In step 362, the mode A rate measurement from the selected gyroscope and the reference rate for the selected gyroscope axis derived from other operating gyroscopes are recorded.

In step 364, the selected gyroscope is operated in a second mode B where maximum vibration amplitude is aligned along the second axis, and gyroscope rate-nulling control energy is supplied along the first axis.

In step 366, the mode B rate measurement from the selected gyroscope and the reference rate for the selected gyroscope axis derived from other operating gyroscopes are recorded.

In step 368, the mode A and mode B measurements are used to determine estimates of the Bias error. The activities of steps 360-368 may be performed, for example, by mode reversal unit 214 of FIG. 7, and by other ancillary elements of control system 200.

The steps or operations described herein are just for example. There may be many variations to these steps or operations without departing from the spirit of the invention. For instance, the steps may be performed in a differing order, or steps may be added, deleted, or modified.

Figure 17:
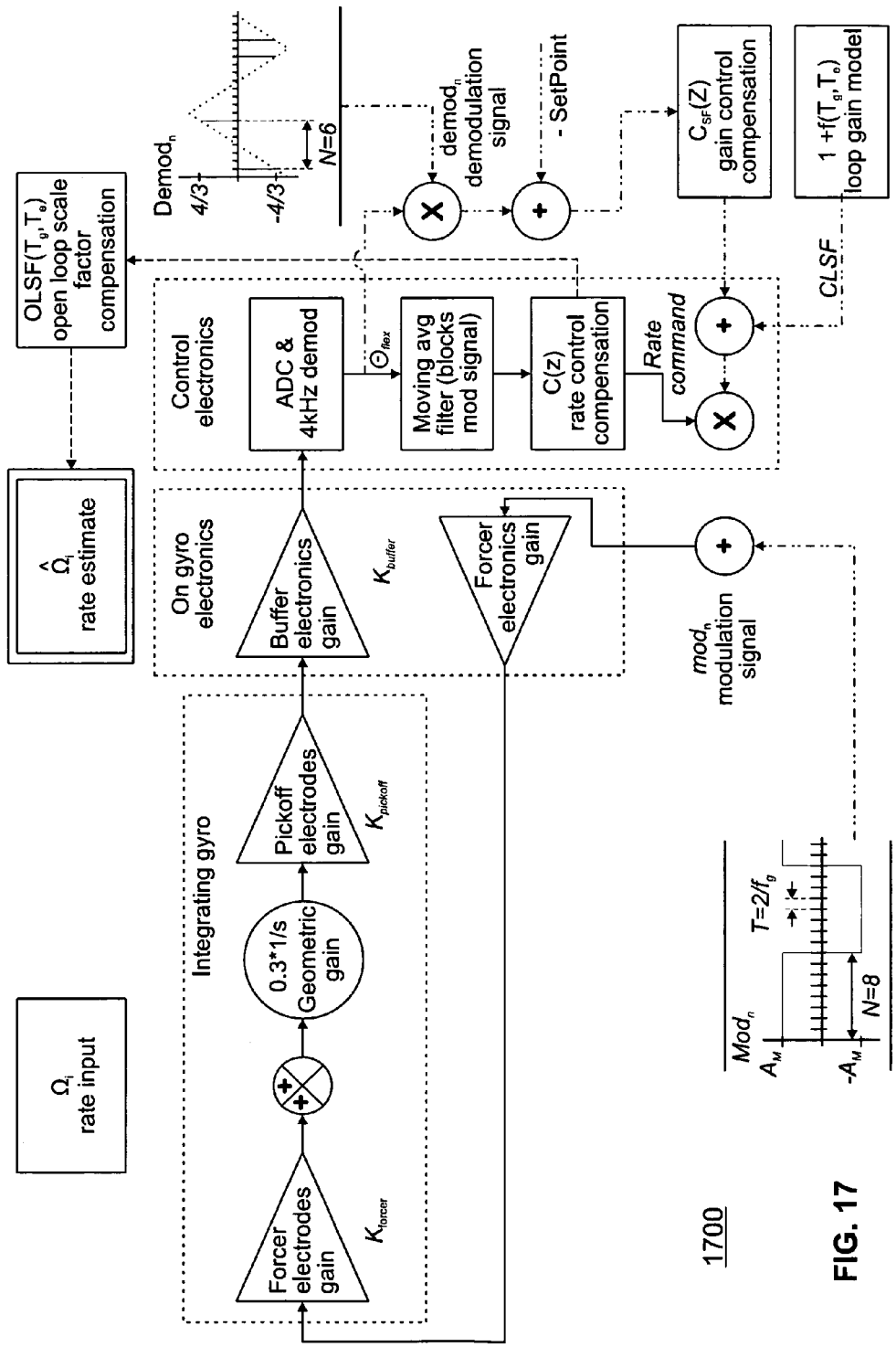
FIG. 17 is a representation of a prior art rate control loop processor utilizing square-wave CLSF modulation.

Turning to FIG. 17, one implementation of a prior art rate control loop processor 1700 performs the closed loop scale factor method. The rate control loop processor 1700 sums a 125 Hz rate square-wave modulation signal into the force to rebalance (FTR) loop command. Since the rate modulation frequency is above the bandwidth of the rate control loop, it causes the flex pattern of the gyros to rotate away from the normal FTR null position by an angle equivalent to the integral of the CLSF rate modulation. The position of the rotated flex pattern is determined from the nodal (ND) and antinodal (AN) pickoff signal ratio, for example, the arctangent of the ratio of the nodal voltage divided by the antinodal voltage. By comparing the measured flex angle to the integral of the rate modulation signal the error in the FTR SF can be estimated.

Figure 11:
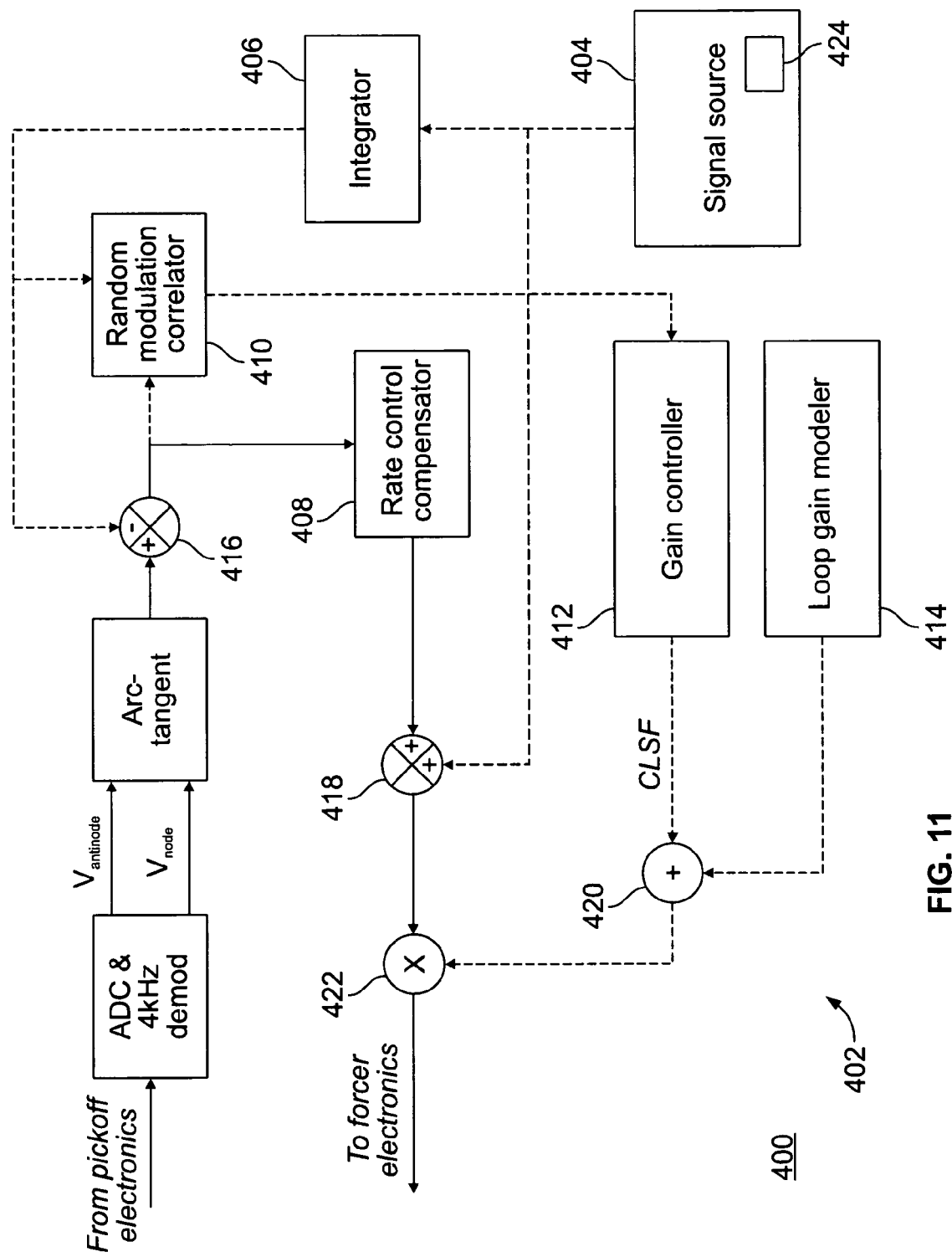
FIG. 11 is a representation of one implementation of an apparatus that comprises a random closed loop scale factor (RCLSF) estimator.
Figure 12:
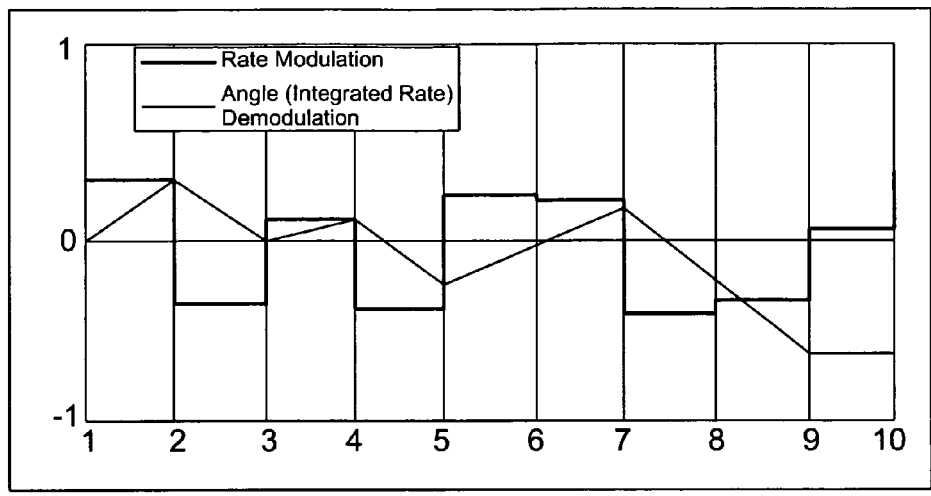
FIGS. 12-14 are representations of implementations of non-uniform rate modulation signals and the corresponding demodulation angle signals.
Figure 13:
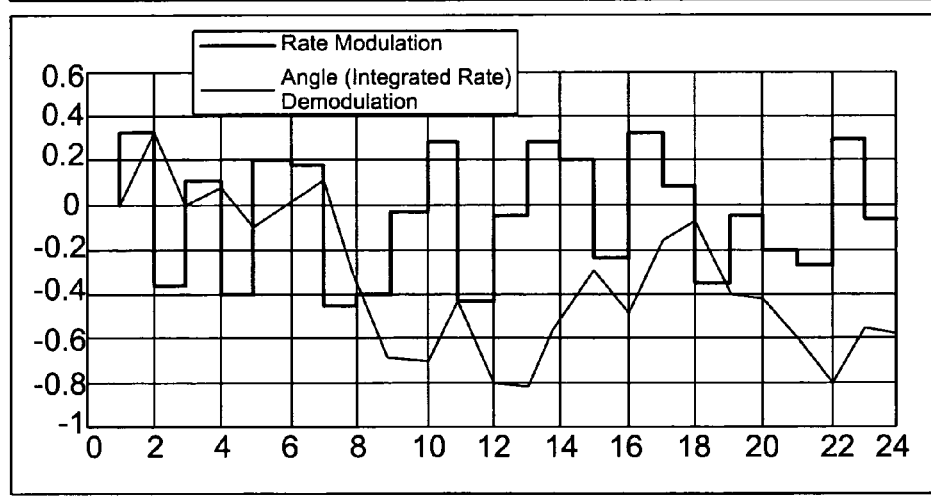
Figure 14:
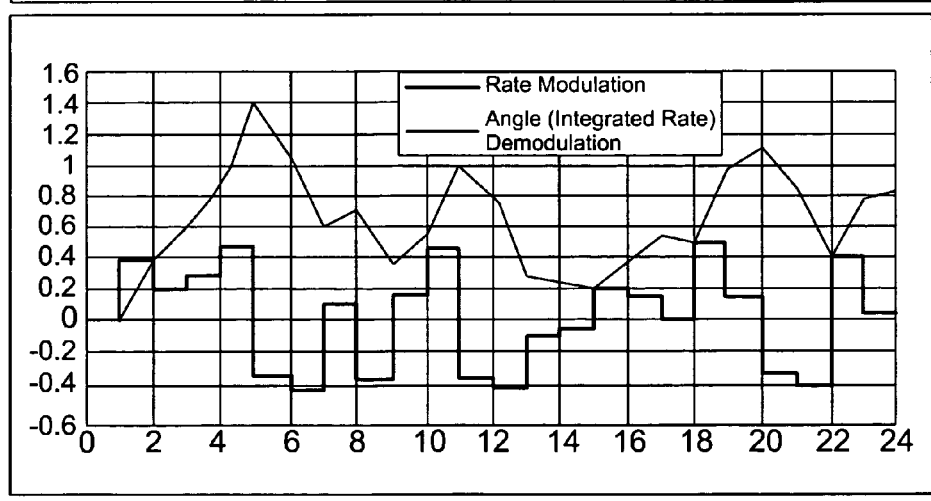
Figure 15:
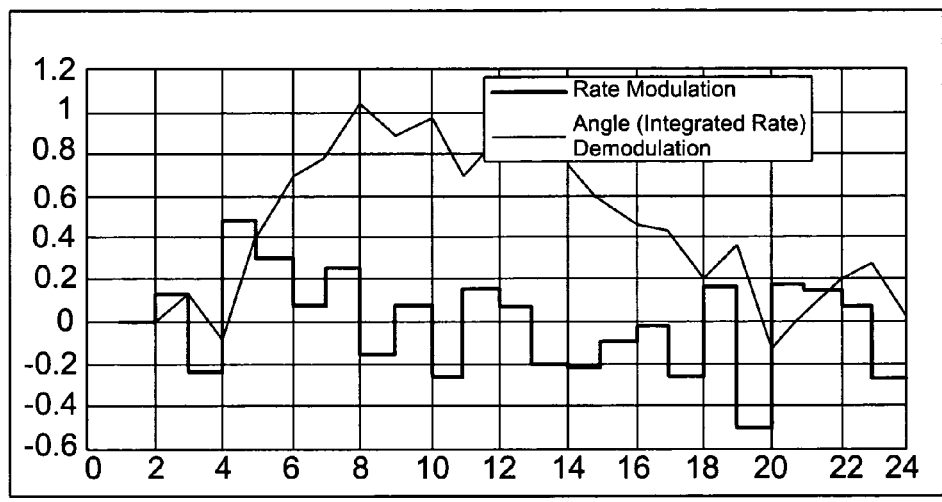
FIG. 15 is a representation of one implementation of a non-uniform rate signal and corresponding demodulation angle signal, illustrating a large excursion in angle.
Figure 16:
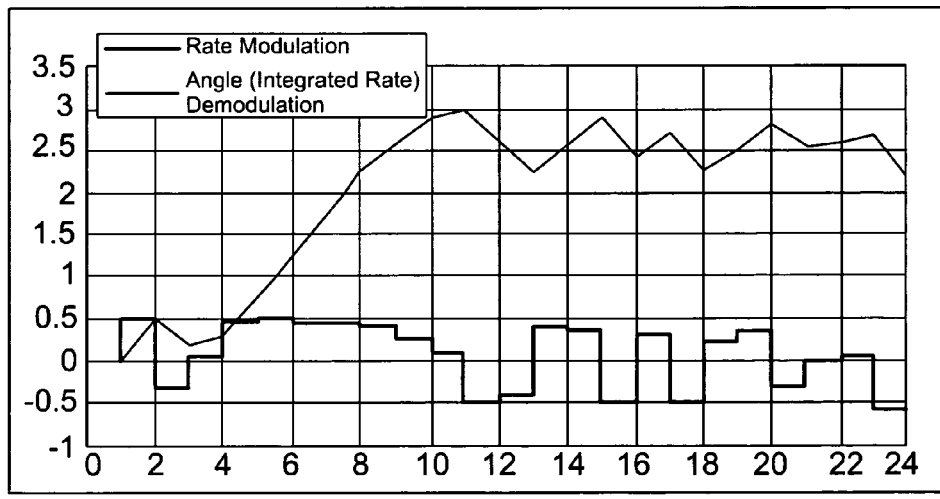
FIG. 16 is a representation of one implementation of a non-uniform rate signal and corresponding demodulation angle signal, illustrating repeated rate values.

FIG. 11 is a representation of one implementation of an apparatus 400 that comprises, in one embodiment a closed loop scale factor (RCLSF) estimator configured to employ a random or pseudo-random modulation signal or sequence, for example, a RCLSF estimator 402. The RCLSF estimator 402 in one example is configured to estimate a force-to-rebalance (FTR) scale factor for a hemispherical resonator gyroscope (HRG). The HRG may be operated in either a force to rebalance (FTR) mode or a Whole Angle (WA) mode. The FTR mode is configured to constrain a resonant standing wave of the HRG by rebalancing the HRG with electrical force, as will be appreciated by those skilled in the art. The RCLSF estimator 402 is configured to employ a random or pseudo-random modulation signal or sequence, for example, in place of the 125 Hz modulation signal of the apparatus 1700 of FIG. 17. The "random" modulation signal is de-correlated from environmental inputs, which allows for higher bandwidth operation.

The RCLSF estimator 402 in one implementation comprises a signal source 404, an integrator 406, a rate control compensator 408, a random modulation correlator 410, a RCLSF gain controller 412, a loop gain modeler 414, and mixers 416, 418, 420, and 422. The signal source 404 provides a modulation signal $\Omega_{r\text{-}mod}$ to the mixer 418. The modulation signal $\Omega_{r\text{-}mod}$ comprises a non-uniform rate signal. The mixer 418 combines the modulation signal $\Omega_{r\text{-}mod}$ with a force to rebalance (FTR) rate signal from the rate control compensator 408 to obtain a feedback rate signal. The mixer 422 mixes the feedback rate signal with a gain adjustment to obtain a forcer command signal and provides the forcer command signal to forcer electronics of the gyroscope.

After analog-to-digital conversion and demodulation, the flex angle $\Theta_{flex}$ is determined with an arctangent of the node voltage $V_{node}$ over the anti-node voltage $V_{anti\text{-}node}$. The integrator 406 provides an angle $\Theta_{r\text{-}mod}$, an integration of the modulation signal $\Omega_{r\text{-}mod}$, to the mixer 416. The mixer 416 subtracts the $\Theta_{r\text{-}mod}$ signal from the $\Theta_{flex}$ signal and passes a difference angle signal $\delta\Theta$ to the rate control compensator 408. The rate control compensator 408 determines the FTR feedback command from the difference angle signal $\delta\Theta$.

The gain adjustment for the mixer 422 is determined by the mixer 420 from the summation of a closed loop scale factor and an open loop gain correction signal. The RCLSF gain controller 412 provides the closed loop scale factor correction and the loop gain modeler 414 provides the open loop gain correction signal. The RCLSF gain controller 412 determines the closed loop scale factor (RCLSF) correction based on a correlation estimate of the difference angle signal $\delta\Theta$ and the angle $\Theta_{mod}$ from the random modulation correlator 410. The RCLSF gain controller 412 may use additional parameters to determine the closed loop scale factor, for example, process and measurement noise parameters. The RCLSF gain controller 412 in one example dynamically adjusts the process and measurement noise parameters based on the stability of the gyroscope and the noise on the gyroscope measurements. If an event occurs which causes a shift in the scale factor level or stability, the RCLSF gain controller 412 may open up the filter gains to allow faster recovery. In another example, the RCLSF gain controller 412 may clamp down the process gains when the gyroscope is operating in a stable environment. This will allow the scale factor estimates to improve to a level where the estimate stability approaches the stability of the sensor physics, which has been shown to be below 1 ppm. The estimation of the FTR scale factor correction from the demodulated rate data may be implemented in various fashions. One implementation comprises a Kalman filter that estimates the SF correction through its correlation to the integrated random rate modulation signal.

The signal source 404 is configured to provide the non-uniform rate signal with one or more desired characteristics. In one example, signal source 404 provides a pseudo-random signal as the non-uniform rate signal, which serves to reduce correlation of an inertial rate input with the non-uniform rate signal. Reduced correlation allows for higher response bandwidth of the HRG signal. The non-uniform rate signal in one example is pre-generated by the signal source 404. In another example, the signal from the signal source 404 is rejected as unusable when the non-uniform rate signal is shorter than a predetermined duration, for example, 10 seconds. In one example, the signal source 404 also provides the modulation angle signal to the random modulation correlator 410 and the mixer 416, which allows removal of the integrator 406. The signal source 404 in one example stores the non-uniform rate signal and/or the modulation angle signal in a lookup table. In a further example, the signal source 404 stores the non-uniform rate signal and/or the modulation angle signal in a memory unit, such as the recordable data storage medium 424, as will be appreciated by those skilled in the art.

The non-uniform rate signal from the signal source 404 in one example is evaluated before storage to ensure that the signal is in compliance with one or more constraints. A first constraint is that the non-uniform rate signal has a mean of zero. This ensures that a value of the integral of the non-uniform rate signal is zero over the predetermined repetition period and serves to prevent a bias error from being added to the rate control compensator 408. Although a long-term evaluation of the non-uniform rate signal may appear "random", a truncated sequence of the non-uniform rate signal may contain frequency content that could interfere with performance of the HRG. Accordingly, a second constraint is that the non-uniform rate signal does not contain dominant frequency content. A third constraint is that the non-uniform rate signal does not contain values that are more than a predetermined number, in one example the constraint is no repeated values for more than three successive steps. A fourth constraint is that a maximum excursion of the integral of the non-uniform rate signal stays within a voltage range of a high gain nodal signal from the HRG. For example, a signal-to-noise ratio of an analog to digital converter is improved using an analog high gain stage for a null point of a servo. The non-uniform rate signal will cause the effective nulling point of the rate control compensator 408 to move in a "random walk" fashion. The maximum of this "walking" should be well within the voltage range of the signal analog electronics and the analog to digital converter, as will be appreciated by those skilled in the art.

Another example of an application where the RCLSF estimator 402 would be valuable is a strategic navigation system which has to continue to operate with high performance after an exposure to a radiation environment. An uncorrected scale factor in this situation would take a very large step due to degradation of a voltage reference and/or amplifier gains. Since the time of degradation due to the radiation environment is accurately known, the Kalman filter of the RCLSF estimator 402 can be opened up to quickly converge to the new value, then refined throughout the rest of the mission as it tightens the Kalman gains. Although the time to converge on the scale factor to the required precision may be longer than desired, a system processor for the RCLSF estimator 402 should be able to correct the prior uncorrected scale factor induced errors once the estimate converges, as will be appreciated by those skilled in the art.

In another application, the RCLSF estimator 402 can be used in a pre-flight mode to provide even higher accuracy estimates since at that time, the vehicle is known to have little or no net motion. This could allow the RCLSF estimator 402 to provide greatly improved scale factor compensation parameters even if mission considerations prohibit its use in-flight.

FIGS. 12-16 are representations of implementations of non-uniform rate modulation signals and the corresponding demodulation angle signals. Examples of non-uniform rate signals and corresponding demodulation angle signals are shown as plots 502, 602, 702, 802, and 902. Plots 502, 602, and 702 show examples of desirable plots for the RCLSF estimator 402 with bounded angles and few repeated values. Plot 802 shows one example of a large excursion in the angle and may be less desirable. Plot 902 shows one example of a series of repeated values in the non-uniform rate signal which may also be less desirable.

The apparatus 400 in one example comprises a plurality of components such as one or more of electronic components, hardware components, and computer software components. A number of such components can be combined or divided in the apparatus 400. An example component of the apparatus 400 employs and/or comprises a set and/or series of computer instructions written in or implemented with any of a number of programming languages, as will be appreciated by those skilled in the art.

The apparatus 400 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 400 comprise the recordable data storage medium 424 of the signal source 404. The computer-readable signal-bearing medium for the apparatus 400 in one example comprise one or more of a magnetic, electrical, optical, biological, and atomic data storage medium. For example, the computer-readable signal-bearing mediums comprise floppy disks, magnetic tapes, CD-ROMs, DVD-ROMs, hard disk drives, random access electronic memory (RAM) or read-only electronic memory (ROM).

Thus, there has been described a self-calibrating gyroscope system that provides improved estimates of, and compensation or calibration for, scale factor error and bias error. The gyroscope system employs a plurality of gyroscope units having sense or input axes in a mutually non-parallel arrangement. The number of gyroscope units is preferably at least one more than the number of axes for which rate estimates are required. A Mode Reversal technique is used to obtain an estimate of bias error for a selected gyro. A Random Closed-Loop Scale Factor technique is used to obtain an estimate of scale factor error for a selected gyro. Because the Mode Reversal technique temporarily disrupts operation of the affected gyroscope, each or the gyroscopes may be taken off-line temporarily, in turn, for calibration, and thereafter returned to normal operation. Because at least one redundant gyroscope is provided, when a selected gyroscope is offline, rate information from the remaining operating gyroscopes can be used to derive a reference rate about the axis of the offline gyroscope.

Although this invention has been described as it could be applied to a cluster of hemispherical resonator gyroscopes, these are merely examples of ways in which the invention may be applied. The invention is not limited to these examples, and could be applied to many other environments.

The embodiments described herein are exemplary. Thus it will be appreciated that although the embodiments are described in terms of specific technologies, other equivalent technologies could be used to implement systems in keeping with the spirit of the present invention.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A gyroscope system comprising:
   a plurality of gyroscopes, each adapted to sense rate about a respective sense axis, each of said sensed rates exhibiting bias error and scale factor error;
   a scale factor error estimator coupled to at least one of said gyroscopes to produce an estimate of scale factor error of such coupled ones of said gyroscopes;
   a mode reversal unit coupled to such coupled ones of said gyroscopes to produce an estimate of bias error of such coupled ones of said gyroscopes; and
   a compensator responsive to sensed rates of such coupled ones of said gyroscopes, said bias error estimate, and said scale factor error estimate to produce rate outputs for such coupled ones of said gyroscopes;
   said rate outputs exhibiting reduced bias error and reduced scale factor error as compared to bias error and scale factor error of corresponding rates sensed by such coupled ones of said gyroscopes wherein said coupled ones of said gyroscopes has a resonator exhibiting a pattern of standing waves having an orientation, wherein an expected position of the pattern and a measured position of the pattern is used to determine a scale factor error of the gyroscope.

2. The system of claim 1 wherein said sense axes are mutually non-parallel.

3. The system of claim 1 wherein said sense axes form an octahedral tetrad.

4. The system of claim 1 wherein the arrangement of said sense axes defines a reference axis and each of said sense axes makes an angle of about 54.7 degrees with respect to said reference axis.

5. The system of claim 1 wherein the resonator exhibits the pattern of a standing wave having an orientation aligned with a first control axis wherein mode reversal comprises aligning the standing wave around a second control axis, wherein said mode reversal unit is a mode reversal bias estimator.

6. The system of claim 1 wherein said scale factor error estimator is a random closed-loop scale factor error estimator where a closed-loop scale factor estimator determines an angular rate based on an amount of force needed to maintain a vibration pattern in a desired position where the vibration pattern occurs in the resonator.

7. The system of claim 1 wherein said system is further adapted to transform a selection of said rate outputs for said gyroscopes to rate outputs about a number of coordinate axes sufficient for navigation, and the number of said plurality of gyroscopes is at least one greater than said number of coordinate axes.

8. The system of claim 1 being further adapted to:
select each of said gyroscopes in turn for bias error calibration, and during said selection to:
take said selected gyroscope offline wherein rate estimates of an offline gyroscope are not used for navigation purposes;
calibrate said selected gyroscope using said mode reversal bias' error estimator; and
return said selected gyroscope online wherein rate estimates for an online gyroscope are used for navigation purposes.

9. The system of claim 8 being further adapted to calculate a reference rate estimate about the sense axis of said selected gyroscope responsive to rate estimates sensed about axes of gyroscopes other than said selected gyroscope while said selected gyroscope is offline; and wherein the gyroscope system comprises a number of gyroscopes at least one greater than the number of rate estimate axes required for navigation of a vehicle.

10. A gyroscope system comprising:
a plurality of gyroscopes;
a controller coupled to the plurality of gyroscopes;
said controller having:
a rate error compensator responsive to at least an uncompensated gyroscope rate signal of a gyroscope for producing a compensated gyroscope rate signal wherein the gyroscope has a resonator exhibiting a pattern of standing waves having an orientation, wherein an expected position of the pattern and a measured position of the pattern is used to determine a scale factor error of the gyroscope.

11. The system of claim 10 wherein each of said gyroscopes have a sense axis and said sense axes are arranged to form an octahedral tetrad.

12. The system of claim 10 wherein said system is used for vehicle navigation requiring rate information in a number of dimensions; and said plurality of gyroscopes numbers at least one more than said number of dimensions.

13. The system of claim 10 wherein said system is used for vehicle navigation requiring rate information about a number of axes; and said plurality of gyroscopes numbers at least one more than said number of axes.

14. The system of claim 10 wherein said rate error compensator is further responsive to a signal representing scale factor error of said gyroscope.

15. The system of claim 14 further comprising:
a scale factor error determinator having a signal generator adapted to produce signals instructing said gyroscope to displace said pattern of standing waves to positions corresponding to values of said signals;
an integrator adapted to integrate said instructing signals and responsively produce signals describing an expected position of said pattern;
and a scale factor estimator responsive to said signals describing the expected position of said pattern and the measured position of said pattern to determine the scale factor error of said gyroscope.

16. The system of claim 10 wherein said rate error compensator is further responsive to a signal representing bias error of said gyroscope.

17. The system of claim 16 wherein said gyroscope has a resonator exhibiting a pattern of standing waves, and further comprising a bias error determinator having:
a bias error extractor; and
mode sequencing logic adapted to produce signals to alternately in time represent a first mode and a second mode, such that when in said first mode, said signals instruct said gyroscope to align said pattern of standing waves along a first axis of said resonator, and when in said second mode, said signals instruct said gyroscope to align said pattern of standing waves along a second axis of said gyroscope different from said first axis;
said bias error extractor responsive to a comparison of rate estimate signals from said gyroscope when in said first mode and said second mode to produce said signal representing bias error of said gyroscope.

18. A method of operating a gyroscope system having a plurality of gyroscopes, comprising:
operating the gyroscope system wherein each of the plurality of gyroscopes is adapted to sense rate about a respective axis, each of said rates exhibiting bias error and scale factor error,
selecting one gyroscope for calibration;
taking the selected gyroscope offline;
determining an estimate of bias error of said selected gyroscope;
determining an estimate of scale factor error of said selected gyroscope wherein said selected gyroscope has a resonator exhibiting a pattern of standing waves having an orientation, wherein an expected position of the pattern and a measured position of the pattern is used to determine a scale factor error of the gyroscope;
compensating a rate output of said selected gyroscope with said bias error estimate and scale factor error estimate;
and returning said selected gyroscope online.

19. The method of claim 18 wherein said selecting step further comprises selecting in turn for calibration each of said plurality of gyroscopes.

20. The method of claim 18 further comprising:
operating said selected gyroscope in a first mode where maximum vibration amplitude of the resonator of the gyroscope is aligned along a first axis thereof;
recording a first-mode rate estimate from said selected gyroscope;
operating the selected gyroscope in a second mode where maximum vibration amplitude of the resonator of the gyroscope is aligned along a second axis thereof different from said first axis;
recording a second-mode rate estimate from said selected gyroscope; and comparing said first-mode rate estimate with said second-mode rate estimate to determine an estimate of bias error affecting said selected gyroscope.

21. The method of claim 18 wherein the gyroscope system comprises a number of gyroscopes at least one greater than the number of rate estimate axes required for navigation of a vehicle.

22. The method of claim 20 further comprising:

operating said gyroscope such that maximum vibration amplitude of the resonator of the gyroscope is driven to alignment with a control axis having a position responsive to an instruction signal;

producing instruction signals from time to time so as to change the position of said control axis;

comparing an instructed position of said control axis as defined by said instructions signals with information from said gyroscope of the actual position of maximum vibration amplitude of the resonator to produce said estimate of scale factor error of said gyroscope.

23. The method of claim 22 wherein said instruction signals command movement of the position of maximum vibration amplitude of the resonator in a substantially random manner.

24. The method of claim 22 wherein said instruction signals command movement of the position of maximum vibration amplitude of the resonator according to a pseudo random sequence.

* * * * *